Sept. 6, 1932.  A. J. HARTLEY  1,875,725
GRAIN MEASURING DEVICE
Filed June 30, 1927  2 Sheets-Sheet 1
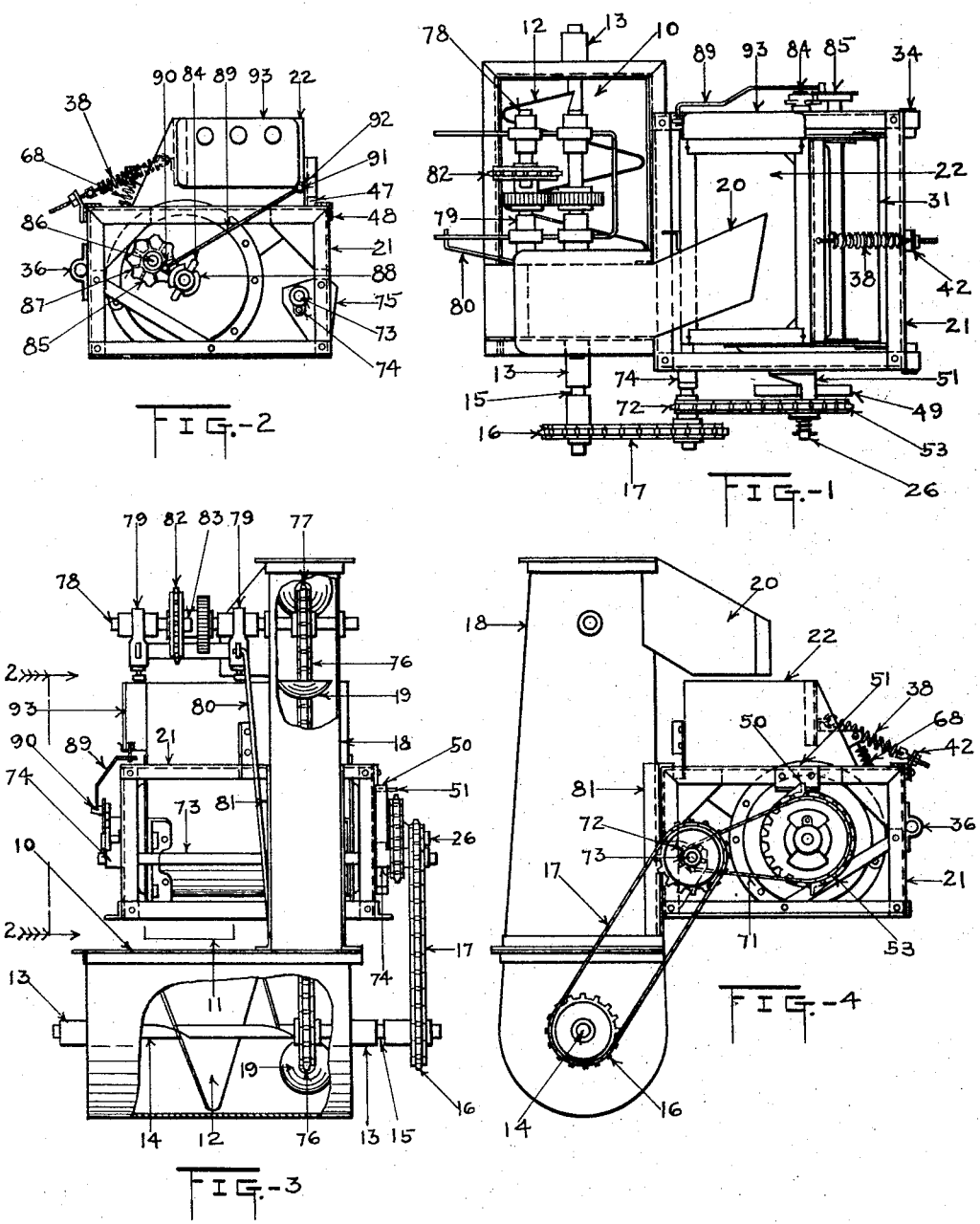
INVENTOR
Arthur J. Hartley
PER
Tefft and Tefft
ATTORNEYS Sept. 6, 1932.  A. J. HARTLEY  1,875,725
GRAIN MEASURING DEVICE
Filed June 30, 1927   2 Sheets-Sheet 2
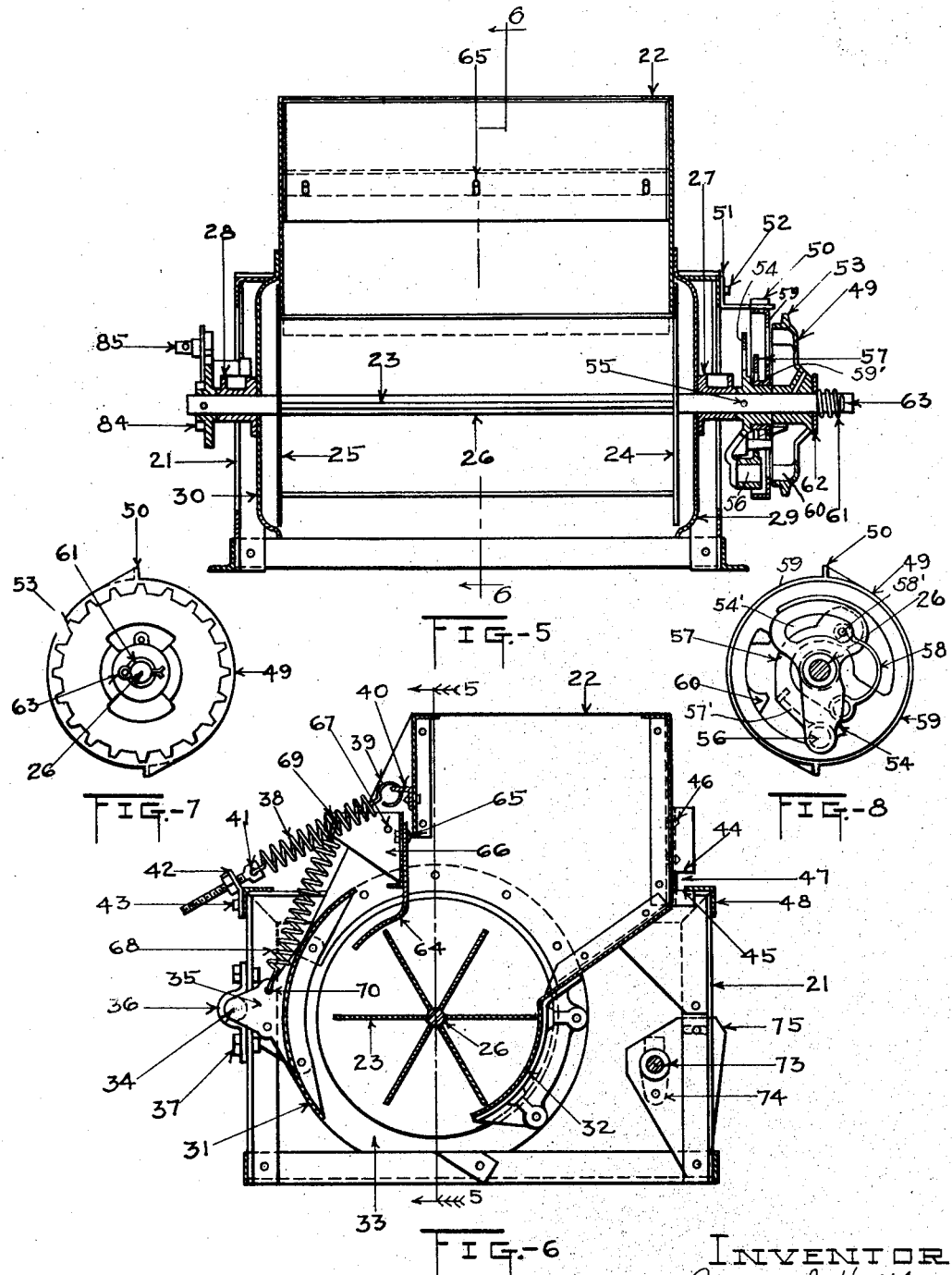

Patented Sept. 6, 1932

1,875,725

UNITED STATES PATENT OFFICE

ARTHUR J. HARTLEY, OF PEORIA, ILLINOIS

GRAIN MEASURING DEVICE

Application filed June 30, 1927. Serial No. 202,509.

This invention relates to grain measuring devices, and more particularly to grain measuring devices adapted to be used in connection with combined harvesting and threshing units.

One of the objects of the invention is in the provision of a grain measuring device that is adapted to be attached to a combined harvesting and threshing unit, said measuring device being adapted to deliver a determined volume of grain, irrespective of the irregular travel of said machine through the field.

Another object is in the provision of a grain measuring device that is adapted to be used in connection with the harvesting and threshing unit, said measuring device including a hopper and grain meter so associated and controlled as to insure the delivery of a measured volume of grain only when there is a determined volume of grain in the hopper.

Still another object lies in the provision of a pivoted hopper, a grain meter disposed in the bottom thereof, a clutch mechanism controlling the operation of the meter, and such adjustable tensioned connection for the hopper as will permit operation and therefore the delivery of a measured amount of grain by the hopper only when the hopper has such volume of grain therein as will insure completely filling the meter.

A further object lies in the provision of a grain measuring device, the same including a rotatable vaned meter and connected mechanism to insure the delivery of a measured amount of grain, irrespective of the irregularities of travel of the machine upon which the measuring device is mounted.

A still further object lies in the provision of a grain measuring attachment for combined harvesters and threshers, said attachment including an auxiliary elevator mechanism having receiving portions adapted to be mounted in a manner to receive the discharge from the elevator upon the thresher unit, there being combined with said auxiliary elevator a hopper and grain meter as well as automatically operating mechanism which insures the delivery of a measured amount of grain, irrespective of the irregularities of travel of the combined machine.

Other objects will appear in the following specification, taken in connection with the annexed drawings, in which:—

Fig. 1 is a plan view of the grain measuring attachment for combined harvesters and threshers;

Fig. 2 is an end elevation, looking in the direction of the arrow 2—2 of Fig. 3;

Fig. 3 is a rear elevation of Fig. 1;

Fig. 4 is a side elevation thereof;

Fig. 5 is a sectional view, taken on the line 5—5 of Fig. 6;

Fig. 6 is a sectional view taken on the line 6—6 of Fig. 5 and showing the details of arrangement of the hopper and grain meter;

Fig. 7 is an end elevation of the clutching mechanism; and

Fig. 8 is an interior detail showing of the clutch.

Before referring specifically to the drawings, it might be stated that the present application is directed specifically to the grain measuring attachment which is adapted to be used upon the well known combined harvester and threshing device.

Applicant has a co-pending application, which was filed on June 6, 1927 and bears Serial Number 196,716, directed generally to the combination of the present grain measuring device with a harvester-thresher, and in this instance merely the grain measuring device itself is disclosed.

It might be stated, however, that the present grain measuring device is adapted to be used upon the well known combined harvester-thresher and has been developed particularly for such use. As a matter of fact, the grain measuring device has been shown in connection with an auxiliary elevator for the purpose of using same upon any of the well known machines upon the market today.

Generally, with respect to the reason for the development of such grain measuring device, it might be said that although grain weighing devices and even grain measuring devices, have been associated with threshers which always remained stationary during operation, nevertheless none of said devices would operate efficiently upon the combined harvesting and threshing units which travel in an irregular and bumpy fashion through the field and therefore would prevent efficient operation of the delicate and sensitive controlling means for said grain weighing devices.

Applicant, realizing that the grain weighing devices known in the art were not adapted for efficient use upon the combined harvester-thresher, commenced experimentation which resulted in the final development of the present grain measuring device, which will and does operate in an efficient manner upon combines, said device not being sensitive to the irregular travel of said machines and operating to automatically deliver a measured volume of grain irrespective of the irregular travel of said machines. The present device is now being used upon combined harvester and thresher units of practically all makes known to the trade in various parts of the farming sections of this country, and is giving absolute satisfaction, as well as accomplishing the new result of permitting the grain measuring operation to be accomplished simultaneously with the harvesting and threshing operation.

The measuring device is made up of the following portions: A receiving portion 10 is disposed directly beneath the discharge spout 11 of the elevator that is connected with the harvester-thresher, said receiving portion containing a screw conveyor 12 therein. This screw conveyor has its bearing supports in either end of the receiving member 10 as shown at 13. As a matter of fact, one end of the shaft 14, upon which the screw conveyor is mounted, is projected outwardly as at 15, and upon the end thereof is securely fastened a sprocket wheel 16, the same providing, through the chain member 17, the driving mechanism for the grain metering or measuring device. Rising from the receiving portion 10, is a housing member 18, in which is disposed the conventional continuously operating elevating sections 19 adapted to deliver the grain from an elevated position through the spout 20. The spout 20 directly overlies the grain metering or measuring mechanism now to be described.

A skeleton framing portion, substantially box-like in shape, is shown at 21. This framing is also connected with the auxiliary elevator and receiving portion in a manner to securely hold same, and as a matter of fact is the framing which is attached to the framing portions connected to the grain bin and holding the grain weighing mechanism disposed therein.

Within the framing 21 is disposed a hopper 22, beneath which, and as a matter of fact forming a part thereof, is a grain metering or measuring device, which comprises a six-vaned grain meter or measuring device 23. This member 23 is disposed in the bottom of the hopper 22 in a manner to form a movable lower portion thereof, the outer ends of same being closed by means of the end pieces 24 and 25. A horizontally disposed rod 26 provides the axis of the meter and the projecting ends thereof are carried in bearings 27 and 28 which are in turn carried in the end plates 29 and 30 of the hopper 22. The meter 23 is enclosed both forwardly and rearwardly by plates 31 and 32 respectively, which are also securely attached to the hopper 22. These plates 31 and 32 are not connected at their lower ends, but as a matter of fact, leave a discharge opening 33 which permits the grain carried by the measuring device to be discharged directly into the grain bin (not shown) which is disposed therebelow.

The combined hopper and grain measuring device connected therewith has a tensioned pivotal mounting within the skeleton framing 21. The pivot point for the hopper is shown at 34, said pivotal connection comprising a bracket 35 secured to the metering device and hopper, and a bracket 36 secured as at 37 to the skeleton framing and the before-described pivotal connection 34. Means for holding the hopper and measuring device in a tensioned relation with respect to the skeleton framing 21 is found in the coil spring 38, which has one end 39 connected to a bracket 40, which is securely attached to the upper portion of hopper 22. The other end of the coil spring 38 has an adjustable engagement 41 with another bracket 42 secured, as at 43, to a part of the skeleton framing.

The above described pivotal and tensioned mounting of the hopper within the skeleton framing is controlled, as respects the up and down movement of the hopper 22 within the skeleton framing, by stop members 44 and 45 which actually compose one bracket that is secured at 46 to the hopper, slotted portion 47 thereof being adapted to receive therein an inwardly projecting portion 48 actually a part of the skeleton framing.

It is apparent that the pivoted and tensioned hopper and grain measuring device has a limited up and down movement.

Before describing the remaining portions of the grain measuring device, it might be stated that this raising and lowering of the hopper and grain measuring device is utilized as a means for operating a clutch member later to be described, which in turn controls the movement of the measuring device.

In Fig. 5, upon one end of the rod 26, which comprises the axis of the meter 23, is found a clutch mechanism generally described as 49. This clutch, which will later be described in detail, is a conventional implement clutch, the same having an upstanding portion 50 which is adapted to be engaged by an outwardly projecting lug 51 secured as at 52 to the skeleton framing 21.

Turning to Fig 4, there may be readily seen in side elevation the exact position of this lug 51 with respect to the clutch, it being readily apparent that the downward movement of the hopper 22 and measuring device, the same being permitted, due to the pivoted and tensioned mounting, will permit a release of the member 50 by the lug 51 and therefore such clutching action as will allow the rotation of the shaft 26 and therefore the operation of the grain measuring device.

Similarly, when the hopper and grain measuring device rises sufficiently to permit re-engagement of the lug 51 with the member 50 of the clutch, movement of the shaft 26 will be stopped, due to the fact that the clutch is now held in unclutched relationship.

The clutch mechanism includes a sprocket wheel 53 freely mounted on the shaft 26. A bracket 54 is pinned as at 55 to the shaft 26. A plate 59 which carries the member 50 above described is mounted for rotation upon a cylindrical portion of the bracket 54 as is shown at 59'. Pivoted as at 56 to the bracket 54 is a pawl 57 having an extension 57' which extends into the plane of the sprocket wheel 53. A spring 58 is secured at one end to the plate 59 and at its opposite end to the free end of the pawl 57. A pin 58' in the free end of the pawl extends through a slot 54' in the bracket 54. Dogs 60 are provided on the interior side of the sprocket 53 and are adapted to be engaged by the extension 57' of the pawl 57. The sprocket 53 and the plate 59 are in frictional engagement so that when the projection 50 is engaged by the lug 51, the sprocket 53 will slip on the face of the plate 59, but when the lug 51 is disengaged the sprocket will drive the plate 50.

The operation of the device is as follows:

When the lug 51 engages the projection 50, a slipping action between sprocket 53 and plate 59 takes place and the shaft 26 remains stationary. When the hopper swings downwardly, however, the sprocket 53 will drive the plate 59 which is now released from the lug 51 in a counter clockwise direction as shown in Fig. 8. Upon this movement the spring 58 will force the free end of the pawl to swing counter clockwise about its pivot 56. The pin 58' will remain in the slot 54' to limit the movement of the pawl. As the pawl is moved over, as to the left in Fig. 8, the projection 57' will catch behind one of the dogs 60 on the sprocket 53 so as to form a positive driving connection between the sprocket and the shaft 26. This driving connection will continue as long as there is sufficient grain in the hopper to hold it in depressed position. As soon, however, as the hopper is raised by the spring 38, the lug 51 will again engage one of the projections 50. When this occurs, the movement of the spring 58 will cease and the continued rotation of the frame 54 will pull around the pivot 56 and, as the other end of the pawl will be held by the spring 58, the projection 57 will be moved in towards the shaft 26 and will be drawn out of engagement with the lug 60, thus breaking the driving connection between the sprocket and the shaft. The sprocket will then continue to turn without driving the shaft until the load of grain reaches a point where it will again move the hopper downward. It is thus clear that as long as the grain continues to pour into the hopper sufficiently fast to keep the hopper depressed, the measuring means will continue to measure out the grain. As soon as the weight of grain in the hopper becomes too small to insure correct measuring, the hopper will be raised by the spring 38 and the measuring action will cease.

Means for holding sprocket 53 in tensioned relation with the clutch mechanism just described is provided in a coil spring 61, there being a washer 62 disposed between the coil spring and the clutch and a pin 63 holding the spring in position. The above described clutch is efficient, as well as fairly quiet in operation, and accomplishes the clutching operation of the metering device, the same being controlled by the upward or downward movement of the hopper, which, as later will be described, is influenced by the volume of grain discharged from the elevator associated with the threshing machine into the hopper 22.

Further, with respect to the hopper 22 and metering device, it is seen that plate 32 which surrounds a portion of the meter 23 is spaced sufficiently closely with the meter 23 as to prevent passage of grain during the filling of the various portions of the meter. However, inasmuch as the meter rotates in a counter-clockwise direction, there has been disposed upon the opposite side of the meter a plate 64 which is in the nature of a safety plate, as same is adjustably connected, as at 65, with a horizontally disposed portion 66, the same having a pivotal mounting 67. This member 66 is held in a normally fixed but tensioned position by means of a coil spring 68, the same being connected, as at 69, with the member 66 and as at 70 with the bracket 35 which is one of the pivotal portions of the hopper and measuring device.

As respects the safety feature of the plate 64, the same, in the first place, is adapted to be adjusted away from and towards the edges of the plural vanes which make up meter 23 by the bolt 65 and the slots in the member 64 as shown in Fig. 5. This is for the reason that various grains may be harvested and threshed, and when small grains are measured, the plate must be disposed very close to the edges of the vanes in the metering device to prevent the passage of the grain therethrough prior to the measuring operation. Without adjustment, this, of course, would prevent accurate measuring of the various grains and for this reason the plate 64 has an adjustable mounting with respect to the portion 66. The pivotal and tensioned mounting of the plate 64 is, as stated before, for the purpose of further safety, in that in some instances extraneous matter such as rocks, etc., might be discharged into the hopper and be caught between the edges of the vanes in the meter 23 and the plate 64. In case this plate were not movable under such pressure, damage to the measuring device might, and probably would, result. However, in case anything is wedged between the vanes and this plate 64, the latter is permitted to move slightly to allow the passage thereunder of such extraneous matter.

From the above description, the operation of the measuring device is thought sufficiently clear as respects the upward and downward movement of the hopper and meter, influenced by the volume of grain and subsequent clutching and unclutching operation of the clutch which is controlled by the lug 51 projecting from the skeleton framing.

Spring 38 may be sufficiently tensioned by manual adjustment of 41 to prevent oscillations of the hopper by jolts and jars when passing over uneven ground.

Means for driving the sprocket 53 and therefore the measuring device, is found in the chain portion 71, said chain engaging a sprocket 72 which is secured to the end of a horizontally disposed intermediate or counter drive shaft 73, the same being supported in brackets 74 which are secured to the skeleton framing 21. This auxiliary drive shaft has an adjustable mounting, as shown at 75, to permit adjustment of the chain 71 which is necessary whenever there is adjustment of the movement of the hopper 22 and measuring device, such adjustment obviously being accomplished by positioning member 75 to take up any slack in chain 71. Chain 17 is but slightly disturbed when 75 is moved about the lower right hand corner of frame 21 (see Figure 2) as a pivot.

The driving connection for the auxiliary sprocket 72 is found in the before-described chain 17 which engages the previously mentioned sprocket 16, the latter being fixedly secured to the outer end of the shaft 14, which provides the axis for the grain conveying auger 12.

As far as the driving connection for the shaft 78 is concerned, it is apparent that the elevating portions are carried at their lower ends upon the sprocket 76, which is secured to the shaft 14, which in turn provides one of the driving connections for the metering device above described.

A similar conventional sprocket 77 in the upper end of the auxiliary elevator section carries the elevating portions at that end, said sprocket being secured to a drive shaft 78 having bearing supports in the elevator housing as well as an auxiliary bearing support 79 supported by means of a vertically disposed rod 80 fixedly secured at its lower end to the framing 81 surrounding the upper portion of the receiving portion 10.

A sprocket 82 is loosely mounted on the shaft 78 and conventional manually operated clutching mechanism 83 disposed adjacent thereto permits a clutched or unclutched relationship of sprocket 82 with drive shaft 78. Any conventional chain mechanism, not shown, may be connected with any moving portion of the thresher and with the sprocket 82, to provide transmission of power to the drive shaft 78 and consequently to the auxiliary conveyor, the auger 12 in the receiving portion and through the previously described chain and sprocket mechanism to the grain metering and measuring device.

There has now been described those portions of the grain metering device which permit actual measuring of the grain when discharged into the hopper 22, it being apparent that when the hopper is adjusted, through the coil spring 38, same will not move downwardly to permit operation of the meter 23 until a certain and determined weight has been discharged into the hopper 22.

It might be stated that the pivotally mounted hopper is tensioned in such manner that same will move downwardly only when a rather considerable weight of grain has been discharged thereinto, therefore rotation of the meter is absolutely prevented unless there is an overabundance of grain in the hopper to completely fill the receiving or vane portions of the meter, as they are continuously or intermittently rotated. Therefore, it is plain that the grain measuring device is not operated directly by the filling of the vanes in the grain meter, thereafter depending upon weight to trip the clutch and cause it to rotate, but there must always be a considerable weight or volume of grain in the hopper to permit actuation of the metering device, which will in turn be insured of full capacity for the plural vane portions at all times. Hence, although it is necessary to have a certain weight or volume of grain in the hopper, nevertheless the grain actually in the hopper is not weighed but same merely permits actuation of the measuring device which is assured of delivering a certain amount during each rotation or partial rotation. When the weight of grain decreases beyond the determined point, the metering device immediately ceases operation until the hopper is refilled to the proper point. Thus, it may be clearly seen that the passage of the combined machine through the field, with a consequent irregular travel, will not affect the operation of the metering device in the least, inasmuch as same will not operate unless there is a determined weight or volume of grain in the hopper, which insures full feed for the metering device.

Means for keeping track of the amount of grain threshed and delivered by the measuring device is provided in the following mechanism: Secured to one of the projecting ends of the shaft 26 which is the axis for the meter, there is an actuating member 84, adapted to move an adjacent sprocket 85 pivotally attached to one side of the meter, as at 86. The sprocket 85, has such a concave fashioning 87 between the sprocket portions as to permit engagement therewith, during the turning movement of the cam like portions 88, which lie adjacent the actuating device 84. In other words, the actuator 84 is adapted to move the sprocket, but in order to permit the even travel of the strocket with respect to the actuating portions, the cam portion 88 is adapted to engage the concave portions 87 on the sprocket to insure such desired even travel. A pitman 89 is pivoted, as at 90, upon the sprocket, said pitman being connected as at 91 at its opposite end with an operating member 92 of a conventional tally 93. This tally 93 is so conventional in design as to obviate the necessity of describing same in detail. It is merely a tallying device which registers each rotation or partial rotation of the metering device, and therefore the actual amount of grain which is delivered to and discharged from the measuring device. This register is well known in grain weighing devices of all kinds, as well as numerous other continuously operating weighing structures. To go into a minute description of this register would involve considerable detail, which is not thought necessary in view of its well known use.

Applicant has described in detail his grain metering or measuring device when same is associated with an auxiliary elevator, same having a receiving portion into which the elevator upon the thresher is adapted to discharge.

What I claim is:

1. A grain measuring device comprising a frame casing, a hopper oscillatably pivoted thereto, a spring tensioned balancing means therefor, a rotatable grain meter disposed in the bottom of said hopper for movement therewith, a clutch member secured to said grain meter, a second clutch member, means for driving said second clutch member, and means controlled by the downward movement of said hopper under a predetermined weight of grain to connect said clutch members to deliver a measured amount of grain.

2. A grain measuring device comprising a frame casing, a hopper oscillatably pivoted thereto, a spring tensioned balancing means therefor, a rotatable grain meter disposed in the bottom of said hopper for movement therewith, and power operated means controlled by the downward movement of said hopper when a predetermined weight of grain is accumulated therein to turn said grain meter to deliver a measured amount of grain.

3. A grain measuring device comprising a frame casing, a hopper oscillatably pivoted thereto, a balancing means therefor, a rotatable grain meter disposed in the bottom of said hopper for movement therewith, said hopper being adapted to be moved downwardly by a predetermined weight of grain therein, and power operated means controlled by the downward movement of said hopper to turn said grain meter to deliver a measured amount of grain.

4. A grain measuring device comprising a frame casing, a hopper oscillatably pivoted thereto, a spring tensioned balancing means therefor, a rotatable grain meter disposed in the bottom of said hopper for movement therewith, said hopper being adapted to be moved downwardly by a predetermined weight of grain therein, and means controlled by the downward movement of said hopper to turn said grain meter continuously when said hopper is held in depressed position.

5. A grain measuring device comprising a frame casing, a pivoted hopper oscillatably mounted therein, mechanism for resiliently holding said hopper in raised position, a plural vaned grain meter rotatably mounted in the bottom of the hopper, said hopper being adapted to be moved downwardly by a predetermined weight of grain therein and means controlled by the downward movement of said hopper to rotate said grain meter and means controlled by the upward movement of said hopper for stopping the rotation of said meter.

6. A grain measuring device comprising a frame casing, a pivoted hopper oscillatably mounted therein, mechanism for resiliently holding said hopper in raised position, a plural vaned grain meter rotatably mounted in the bottom of the hopper, said hopper being adapted to be moved downwardly by a predetermined weight of grain therein and means controlled by the downward movement of said hopper to rotate said grain meter and means controlled by said hopper for stopping the rotation of said meter when said hopper is returned to raised position, and a tally mechanism operably connected to the grain meter to register the amount of grain delivered.

7. A grain measuring device comprising a frame casing, a pivoted hopper oscillatably mounted therein, mechanism for resiliently holding said hopper in raised position, a plural vaned grain meter rotatably mounted in the bottom of the hopper, said hopper being adapted to be moved downwardly by a predetermined weight of grain therein and means controlled by the downward movement of said hopper to rotate said grain meter and means controlled by said hopper for stopping the rotation of said meter when said hopper is returned to raised position, and an adjustable plate member disposed adjacent the outer edges of the vanes of the grain meter, said plate being capable of adjustment in direct relation with the size and condition of the grain measured.

8. A grain measuring device comprising a frame casing, a hopper oscillatably pivoted thereto, a spring tensioned balancing means therefor, a rotatable grain meter disposed in the bottom of said hopper for movement therewith, a clutch member secured to said grain meter, a second clutch member, means for driving said second clutch member, means controlled by the downward movement of said hopper under a predetermined weight of grain to connect said clutch members to turn said meter, and means controlled by the upward movement of said hopper to disconnect said clutch members.

9. A grain measuring attachment for a combined harvesting and threshing unit comprising an auxiliary elevator including a grain receiving portion therein, a framing member connected to said auxiliary elevator, a grain receiving hopper pivotally mounted to oscillate in said framing, a vaned grain meter rotatably mounted in the bottom of said hopper, and power operated means controlled by the downward movement of said hopper to turn said grain meter to deliver a measured amount of grain.

10. A grain measuring attachment for combined harvesting and threshing units comprising an auxiliary elevator section including a receiving portion, a framing portion connected therewith, a hopper for receiving the grain discharged from the auxiliary elevator section pivoted in said framing portion for oscillation, an adjustable spring tensioned balancing means for said hopper, a vaned grain meter rotatably mounted in the bottom of said hopper, a clutch member attached to the grain meter, a second clutch member, power means for driving said second clutch member, and means on said framing portion adapted to hold said clutch members in disconnected relation when said hopper is in raised position, said last named means becoming inoperative upon downward movement of said hopper due to the accumulation of a predetermined weight of grain therein.

11. A grain measuring attachment for combined harvesting and threshing units comprising an auxiliary elevator section including a receiving portion, a framing portion connected therewith, a hopper for receiving the grain discharged from the auxiliary elevator section pivoted in said framing portion for oscillation, an adjustable spring tensioned balancing means for said hopper, a vaned grain meter rotatably mounted in the bottom of said hopper, a clutch member attached to the grain meter, a second clutch member, power means for driving said second clutch member, and means on said casing framing portion adapted to hold said clutch members in disconnected relation when said hopper is in raised position, said last named means becoming inoperative upon downward movement of said hopper due to the accumulation of a predetermined weight of grain therein, and means for limiting the oscillation of said hopper.

In testimony whereof, I have hereunto affixed my signature.

ARTHUR J. HARTLEY.